United States Patent [19]

Shawl et al.

[11] 4,130,633
[45] Dec. 19, 1978

[54] REMOVAL OF SELENIUM FROM URETHANE SOLUTIONS

[75] Inventors: Edward T. Shawl, Wallingford, Pa.; Ming N. Sheng, Cherry Hill, N.J.; John G. Zajacek, Devon, Pa.

[73] Assignee: Atlantic Richfield Company, Los Angeles, Calif.

[21] Appl. No.: 864,172

[22] Filed: Dec. 27, 1977

[51] Int. Cl.$^2$ .............................................. C01B 19/00
[52] U.S. Cl. .................................... 423/509; 423/510; 560/25
[58] Field of Search .............................. 423/508–510; 560/25

[56] References Cited

U.S. PATENT DOCUMENTS

| | | | |
|---|---|---|---|
| 1,915,703 | 6/1933 | Towne et al. | 423/510 |
| 3,437,453 | 4/1969 | Serpinet et al. | 423/509 |
| 3,577,216 | 5/1971 | Weiss et al. | 423/509 |
| 3,895,054 | 7/1975 | Zajacek | 560/25 |
| 4,038,375 | 7/1977 | Vorachek et al. | 423/510 |
| 4,038,376 | 7/1977 | McCoy et al. | 423/510 |
| 4,038,377 | 7/1977 | Washall et al. | 423/510 |
| 4,041,139 | 8/1977 | Washall | 423/510 X |
| 4,055,629 | 10/1977 | Rosenthal | 423/509 |
| 4,055,630 | 10/1977 | McCoy et al. | 423/510 X |

*Primary Examiner*—Earl C. Thomas
*Attorney, Agent, or Firm*—Delbert E. McCaslin

[57] ABSTRACT

A method for the removal and recovery of selenium from a urethane solution containing selenium compounds, which may be in the form of inorganic selenium and/or organoselenium compounds, which comprises contacting the selenium-containing urethane solution at a suitable temperature with an aqueous hydrogen peroxide solution and recovering the selenium from the resulting selenium compound enriched aqueous phase in a form suitable for reuse in the preparation of urethanes, the deselenized urethane remaining in the hydrocarbon and/or organic phase.

19 Claims, No Drawings

REMOVAL OF SELENIUM FROM URETHANE SOLUTIONS

BACKGROUND OF THE INVENTION

In the U.S. Pat. No. 3,895,054 there is disclosed a process for the manufacture of urethanes (carbamic acid esters) by reacting an organic compound containing at least one hydroxyl group, e.g., ethyl alcohol, with carbon monoxide and a nitrogenous organic compound at elevated temperature and pressure in the presence of a selenium catalyst and a base and/or water.

The present invention is directed to a simple and effective method of recovering the selenium from urethane solutions produced, for example, by the above described process and containing selenium which may be in the form of selenium per se, inorganic selenium compounds and organoselenium compounds. Because of the high reactivity of selenium, when used as a catalyst as in the above reaction, its combination with organic compounds very frequently results in the formation of organoselenium compounds, such as benzoselenazol and diethyl diselenide, which remain in solution with the urethane reaction product. In such reaction a portion of the selenium catalyst such as selenium per se or selenium dioxide, selenium disulfide, selenium oxychloride, etc. is converted to one or more organoselenium compounds which may be classified generally as selenols, selenides, benzoselenazoles, esters of selenocarbonic acid, selenic acid and selenious acid, selenones and the like. The type and number of organoselenium compounds which may be formed in a function of the reaction conditions used to produce the urethanes such as time, temperature, pressure and solvent. In addition, the inorganic selenium compounds used as catalysts or formed in the reaction may also remain in solution with the urethane product.

Because of the cost of selenium, it is essential that as much of the selenium be recovered from the urethane reaction product as is possible and from the inorganic or organoselenium compounds in a form suitable for reuse as a catalyst.

Prior art processes have been proposed for the recover of selenium from certain organic reaction products including urethane solutions. However, such prior art processes which disclose extraction processes as well as adsorption and chemical complexing of the selenium compounds still leave appreciable amounts of the selenium-containing compounds in the urethane solution.

U.S. Pat. No. 3,084,994 discloses a method for the recovery of selenium from a gas containing selenium together with aldehydes and nitriles using water sprays to collect the selenium and atomizing the selenium-containing water in molecular oxygen-containing gas in contact with an oxide of copper, iron or nickel at 500° C. to convert the selenium in the water solution to selenium dioxide.

U.S. Pat. No. 1,915,703 describes a method for the recovery of spent selenium from hydrocarbon conversion products such as naphtha obtained in the pyrolysis of the hydrocarbons in the presence of selenium, by extracting the selenium with an alkaline solution and subjecting the alkaline solution to treat with an oxidizing agent such as hydrogen peroxide, oxygen and air to precipitate selenium which may be filtered from solution.

A number of recently issued patents, namely, U.S. Pat. Nos. 4,055,630; 4,055,629; 4,041,139; 4,038,377; 4,038,376; 4,038,375 disclose the removal of selenium compounds from urethane solutions using copper (I) chloride and an amine or nitrile complexing agent, mixtures of metals and metal oxides of Group IB, IIB, VIB, and VIIIB elements, liquid-liquid extraction with water and a saturated aliphatic or acyclic hydrocarbon, liquid-liquid extraction of a hydrocarbon solvent solution of selenium-containing urethanes with aqueous ammonium hydroxide or alkali metal hydroxides, metal oxides and an aqueous mercuric salt compound respectively.

SUMMARY OF THE INVENTION

This invention relates to a process for the removal and recovery of selenium from organic urethane solutions containing selenium or compounds thereof. More specifically, the present invention concerns a process for the removal of selenium compounds from urethanes obtained from the selenium catalyzed conversion of an organic nitro compound in the presence of a base to produce a urethane as described for example in the aforementioned U.S. Pat. No. 3,895,054 and incorporated herein by reference. The crude urethane products produced by such process, which may contain one or more organoselenium compounds as well as metallic selenium and/or inorganic selenium compounds, are distilled to remove and recover reaction solvents, unreacted alcohol and any contained amine base such as pyridine and triethylamine which may be present. The remaining urethane-selenium mixture is then contacted in the molten form or in solution with a water in soluble hydrocarbon such as benzene, toluene, xylene, etc., with an aqueous hydrogen peroxide solution without affecting the urethane product and minimizing solubility and loss of urethane while substantially removing the selenium compounds in the form of for example, selenoxide, selenium dioxide, inorganic or organic seleninic and selenonic acids into the aqueous phase. By such process of the invention substantial amounts of the selenium compounds in the above noted form, or converted to such form by the hydrogen peroxide, are extracted into the aqueous phase while the essentially deselenized urethane remains in an organic or hydrocarbon phase. The selenium enriched aqueous phase may be separated from the organic or hydrocarbon phase by any appropriate liquid phase separation method, such as decantation, and the selenium enriched aqueous hydrogen peroxide phase further processed leaving a selenium compound concentrate which may be treated to recover the selenium in a form suitable for reuse in the urethane synthesis reaction. One advantage provided by the process of the present invention is the relative simplicity of adding hydrogen peroxide to a selenium-containing urethane reaction product or hydrocarbon solution of such urethane reaction product followed by extraction of the selenium from the urethane with substantially no loss of the urethane. The hydrocarbons which may be employed must be essentially water insoluble and form a two phase system with the aqueous hydrogen peroxide solution.

It is an object of this invention therefore to provide a process for the substantial recovery of valuable selenium from selenium-containing urethane solutions and the ultimate purification of the urethane.

It is another object of this invention to provide a process for the recovery of selenium in a form suitable for recycle and reuse as a catalyst for the synthesis of urethanes from an organic compound containing at least one hydroxyl group with carbon monoxide and a nitrogenous organic compound.

It is a further object of this invention to recover contained selenium values from urethane solutions utilizing an aqueous hydrogen peroxide solution and to recover the selenium from the resulting aqueous phase in a form suitable for recycle and reuse in the urethane synthesis process.

These and other objects and advantages of this invention will become apparent from the description of the invention which follows and from the claims.

DESCRIPTION OF THE INVENTION

In accordance with the present invention, a urethane solution containing selenium or compounds thereof, as for example, a urethane solution obtained by reacting an organic compound containing at least one hydroxyl group such as ethanol with carbon monoxide and an organic nitrogenous compound such as nitrobenzene containing at least one non-cyclic group, in which a nitrogen atom is directly attached to a single carbon atom and is also attached through a double bond to an oxygen or nitrogen atom, at elevated temperatures and pressures in the presence of a metallic selenium or selenium compound catalyst and a base and/or water, is distilled to remove contained alcohol, e.g., ethyl alochol and any contained amine base, e.g., pyridine and/or triethylamine, which may be present, which materials can be replaced or exchanged by an aromatic hydrocarbon, such as xylene leaving a hydrocarbon solution containing urethanes, selenium compounds, and any unreacted nitrogenous compound. When metal salts of carboxylic acids, sulfonic acids and phosphoric acids are used as the base by the process of U.S. Pat. No. 3,895,054 they are of course not distilled off but precipitate upon the addition of the water insoluble aromatic hydrocarbon and may be removed by, for example, filtration. When the urethane is to be treated in the molten state the salts may simply be washed out from the crude or distilled selenium-containing urethane with water prior to contact with the hydrogen peroxide. The carbamate reaction product which is essentially solvent free may also be treated directly in the molten form after removal of the alcohol and base provided it has a melting point of 120° C. or less. The hydrocarbon/urethane/selenium solution or the molten reaction product urethane is then subjected to treatment with a 0.5 percent to 50 percent aqueous hydrogen peroxide solution at suitable temperatures, preferably between 25° C. and 120° C. to react with, extract and remove selenium compounds from the hydrocarbon/urethane/selenium solution or molten urethane solution into the aqueous phase to provide an essentially deselenized urethane solution and to recover the valuable selenium.

The distillation of the crude effluent urethane solution to strip off unreacted alcohol and any amine base and/or water may be carried out under subatmospheric or atmospheric pressures at temperatures of from about ambient temperatures to 200° C. and preferably from about 50° C. to 150° C. The alcohols and amine bases which may be present may be stripped from the crude urethane solution leaving a residue of urethanes containing selenium compounds and possibly unreacted nitrogenous compounds, such as 2,4-dinitrotoluene, which may then be dissolved in an essentially water insoluble hydrocarbon, or the alcohol and amine may be exchanged with the hydrocarbon during distillation so long as the hydrocarbon has a higher boiling point than the alcohol and amine base being removed. The above residue of urethanes as indicated hereinabove may be directly treated with hydrogen peroxide for the removal of selenium provided the urethane has a melting point below 120° C.

The hydrocarbon/urethane/selenium solution, or the molten urethane selenium-containing residue when contacted with the aqueous hydrogen peroxide solution forms two phases, namely, a urethane containing hydrocarbon phase and a selenium aqueous phase, or an organic (urethane) phase and selenium containing aqueous (hydrogen peroxide) phase respectively, which phases are readily separated, e.g., by decantation, for further processing to recover the urethane, hydrocarbon and selenium. Batch, semi-continuous or continous processing methods may be employed.

The amount and type of selenium compounds in the crude urethane reacton product will generally depend on the type and amount of selenium compound, including selenium per se, employed to produce the urethane as well as the reaction conditions and urethane being produced. Thus, the amount of selenium in the form of selenium per se, inorganic selenium compounds or organoselenium compounds, can range from about ½ to 5 percent but will generally be from about 1 to 3 percent by weight of the urethane solution produced.

The essentially water insoluble aromatic hydrocrbons, or mixtures thereof, which may be employed to form a hydrocarbon/urethane/selenium solution may be for example benzene and the nitro, phenyl, alkyl and/or halogen substituted benzene derivatives such as for example, xylenes, toluene, nitrobenzene, ethylbenzene, trimethylbenzene, dichlorobenzene, o-, m-, and p-terphenyl, etc. The preferred hydrocarbons are nitrobenzene and xylenes.

While, as indicated, mixtures of the hydrocarbons may be employed, it is preferable to use individual hydrocarbons in order to lessen any recovery problem.

Generally from 30 weight percent and up to 90 weight percent of the aromatic hydrocarbon based on the total hydrocarbon/urethane/selenium solution is employed in order to carry out the extraction of the selenium compounds from the urethane solution upon contact with the aqueous hydrogen peroxide solution. Lesser amounts of the aromatic hydrocarbons may be used so long as a two phase system is produced on contact with the aqueous hydrogen peroxide solution. Larger amounts of hydrocarbon may also be used, i.e., up to +99 percent but is avoided since there is no apparent improvement in results, and accordingly, the additional hydrocarbon would only necessitate the recovery of a larger volume of the hydrocarbon from the urethane rendering the process economically unattractive.

Treatment of the crude selenium-containing urethane, i.e., an effluent urethane obtained, for example, by the selenium catalyzed process described in U.S. Pat. No. 3,895,054 employing a base and/or water, from which the reactant alcohol and any amine which may be present have been removed and in which some reaction solvent, e.g., nitrobenzene may remain is carried out by heating the residual urethane until liquid, and adding aqueous hydrogen peroxide which is heated to the melt point of the urethane being treated and at the desired weight percent concentration with stirring to effect removal of the selenium compounds into the resulting aqueous (hydrogen peroxide) phase. The aqueous phase is separated from the resultant organic phase containing the deselenized urethane either at reaction (molten) temperatures or after cooling and further treated to recover the selenium in a desired form for reuse. In a continuous process, for example, molten urethane could be fed into a stirred reactor along with heated aqueous hydrogen peroxide and into a separator for further processing.

The aqueous hydrogen peroxide solution may be added to the hydrocarbon/urethane/selenium solution or molten urethane solution at temperatures of from 25° C. to 120° C. preferably 60° C. to 90° C. depending on the urethane to be treated. Generally, the concentration of the aqueous hydrogen peroxide solution, e.g., a 1 percent or 50 percent solution, and the selenium compound content of the hydrocarbon/urethane/selenium solution or molten urethane solution to be treated will determine the volume ratio of hydrogen peroxide solution to be added. The volume ratio of aqueous hydrogen peroxide solution to hydrocarbon/urethane/selenium solution or molten urethane solution which may be employed to extract selenium compounds into the aqueous phase by the process is from about 5:1 to 1:100 preferably from 1:1 to 1:50. The aqueous hydrogen peroxide solutions of the present invention may also be in the presence of salts of metals such as molybdenum, tungsten, vanadium, etc.

The concentration of the hydrogen peroxide in the aqueous solutions employed may be from about 0.5 weight percent to about 50 weight percent and preferably from about 3 weight percent to about 30 weight percent.

The selenium recovery extraction process to the invention is carried out at temperatures of from about 25° C. to temperatures of up to about 120° C. Preferably the process is carried out at temperatures between about 60° C. and 90° C. Generally atmospheric pressures are employed in the process of the instant invention. However, since an aqueous system is employed, pressures of from 1 to 5 atmospheres may be used especially at reaction temperatures above 100° C.

Contact time of the aqueous hydrogen peroxide solution with the hydrocarbon selenium-containing urethane solution, or the molten urethane solution, to permit the hydrogen peroxide to react with the contained selenium compounds and the extraction of the selenium compounds from the urethane into the aqueous phase may vary within a range of from a few minutes to several hours depending on the selenium compound or compounds in the urethane solution to be removed, the concentration of $H_2O_2$ in solution and the temperature employed. Generally, the contact time will range between about two minutes and two hours. In addition, the reaction and extraction of selenium-containing urethane solutions may be carried out in a number of stages or successive treatments of the raffinate with the same or varied strength aqueous hydrogen peroxide solutions in order to optimize removal of the soluble selenium compounds contained in the urethane.

Once the selenium enriched aqueous (hydrogen peroxide) phase has been separated from the hydrocarbon/urethane phase, or organic (urethane) phase, for example, by decantation, it may be treated in a number of ways to recover the selenium in catalytically useful form for further urethane synthesis. A preferred method is to evaporate or flash the water off and recover the remaining selenium compound concentrate which concentrate, may be subjected to a further treatment employing for example, combustion temperatures, as hereinafter described. The hydrocarbon/urethane phase or organic urethane phase may be water washed to remove any traces of selenium and hydrogen peroxide which may be combined with the selenium-containing aqueous (hydrogen peroxide) phase prior to treatment.

The selenium compound concentrate containing various selenium compounds, including selenium dioxide, may be treated in a number of ways to recover the selenium in catalytically useful form. One method is to heat the concentrate to between 250° C. to 750° C. in an inert gas stream and collect the volatilized selenium per se. Another suitable and preferred method for recovery of the selenium is to convert all of the selenium, in the presence of air or oxygen, to selenium dioxide at temperatures of from 300° C. to 800° C., preferably 400° C. to 650° C., and recover the $SeO_2$ from the effluent reactor stream by cooling to below the sublimation point of $SeO_2$ (approx. 300° C.) to collect the $SeO_2$.

Selenium per se, which may also be present in the original crude urethane reaction product or in the solvent exchanged hydrocarbon/urethane/selenium solution, may be readily recovered preferably by bubbling air through the crude urethane solution to precipitate and essentially remove by filtration the contained elemental selenium, and the selenium compounds then recovered by the process of the present invention.

Although the process of the present invention will be directed to the treatment for the removal and recovery of selenium compounds from a crude urethane which is an ethylphenylcarbamate or diethyltoluene-2,4-dicarbamate solution containing selenium compounds and produced by the process of U.S. Pat. No. 3,895,054, it is not intended that the process be limited to such carbamate solutions and those skilled in the art will recognize that the present process that the present process is broadly applicable to the treatment of other urethanes such as methyl N-phenyl carbamate, diethyltoluene-2,6-dicarbamate, dibutyltoluene-2,4-dicarbamate, etc. which have been prepared, for example, by the selenium catalyzed process as described in U.S Pat. No. 3,895,054.

The following Examples are provided to illustrate the recovery of selenium compounds from a urethane solution in accordance with the principles of this invention but are not to be construed as limiting the invention in anyway except as indicated by the claims.

In the Examples which follow the urethane solutions were obtained by taken the effluent from a metallic selenium catalyst conversion of nitrobenzene or 2,4-dinitrotoluene to the corresponding urethane employing an amine base as described in U.S. Pat. No. 3,895,054. The crude urethane solutions contained approximately 14–18 percent ethanol, 50–60 percent ethylphenylcarbamate or diethyltoluene-2,4-dicarbamate and related by-products, 25–30 percent triethylamine/pyridine mixture and approximately from about ½ to 3 percent selenium as unreacted metallic selenium, unidentified inorganic selenium and organoselenium compounds. Unless otherwise noted, the crude urethane solutions, i.e., containing ethylphenylcarbamate or diethyltoluene-2,4-dicarbamate, unreacted nitrobenzene or 2,4-dinitrotoluene, unreacted ethanol, a triethylamine/pyridine base mixture and a mixture of elemental selenium and various inorganic and organoselenium compounds were treated by bubbling air through the solutions and filtered to remove elemental selenium. The filtrate was distilled to remove the ethanol, amine base mixture and some of the unreacted nitrobenzene or 2,4-dinitrotoluene with or without the addition of a hydrocarbon solvent. When no hydrocarbon solvent was added the remaining urethane solution was treated in the molten state. The selenium compound removal reactions were carried out in a 250 ml. three neck flask fitted with a thermometer, mechanical stirrer to ensure good contact between phases in the two phase system and a heating mantle. The reactants, selenium-containing urethane and hydrogen peroxide of desired concentrtion, were charged to the flask, stirred and heated to the desired temperature for the specified reaction time after which the solutions were cooled and the phases were allowed to separate. After separation of the selenium enriched aqueous (hydrogen peroxide) phase the remaining deselenized hydrocarbon/urethane or organic urethane solution was analyzed by x-ray to determine selenium removal or subjected to high speed liquid chromatographic analysis to determine urethane content.

EXAMPLE 1

Air was bubbled through a 50 ml. solution of a selenium containing diethyltoluene-2,4-dicarbamate reaction product which was then filtered to remove precipitated selenium per se (18 percent of total selenium), and then distilled at a temperature of 120° C. to remove ethanol, pyridine and triethylamine which materials were replaced with xylene. The remaining xylene/urethane/selenium compound solution (43.4 g.) containing, 0.156 weight percent selenium as unidentified soluble selenium compounds. 17.8 weight precent urethane and approximately 82 weight percent xylene which was heated to a temperature of 78° C. was contacted with 0.7 g. of an 11 percent concentration aqueous hydrogen peroxide solution also heated to a temperature of 78° C. for 1 minute and the mixture quench cooled with water. The xylene layer containing urethane was separated from the aqueous (hydrogen peroxide) layer and the layers analyzed by x-ray fluorescence and high speed liquid chromatography to determine selenium remaining in solution and urethane content. Analysis showed 96 percent selenium removal with 100 percent diurethane recovery. The selenium enriched aqueous hydrogen peroxide phase was evaporated by heating to remove water leaving a selenium compound concentrate which was further treated by heating to a temperature of 500° C. in the presence of air to convert all the selenium contained in the concentrate to selenium dioxide which was recovered by cooling the effluent air/SeO$_2$ stream to approximately 250° C. to condense the SeO$_2$.

EXAMPLE 2

A 50 g. solution of crude selenium-containing ethylphenyl carbamate (containing 0.39 weight percent selenium, 15.4 weight percent carbamate, 5 weight percent nitrobenzene and approximately 79 weight percent xylene) which had been treated with air to remove elemental selenium and distilled at a temperature of 60° C. at 250 mm. of mercury to remove ethanol), pyridine and triethylamine, which was replaced with xylene, was charged to the reaction flask along with 1.0 g. of a 10 percent aqueous hydrogen peroxide solution. The mixture was heated with stirring to 85° C. for 30 minutes. Analysis of the hydrocarbon (xylene)urethane phase and aqueous phase containing selenium indicated 98.4 percent removal of selenium compounds with 100 percent urethane recovery. The aqueous phase was further processed as in Example 1 for recovery of selenium as selenium dioxide.

EXAMPLE 3

The procedure of Example 2 was repeated except that xylene solvent was not added to replace the ethanol and amines removed by distillation and the urethane was treated in the molten state. 8.00 g. of the selenium-containing ethylphenylcarbamate (containing 0.18 weight percent selenium, 86 percent carbamate, and unreacted nitrobenzene) was contacted with 1.0 g. of a 4.3 weight percent aqueous hydrogen peroxide solution at 85° C. for a period of 60 minutes. After cooling and separation of the resulting organic urethane phase and the selenium containing aqueous phase, analysis showed 97.6 percent selenium removal with 100 percent urethane recovery.

EXAMPLE 4

A number of runs were made in accordance with the procedures of Examples 1, 2 and 3 employing crude ethylphenylcarbamate (EPC) and diethyltoluene-2,4-dicarbamate (TDU) solutions with or without added solvent utilizing various concentrations of hydrogen peroxide and varied reaction conditions. The reaction conditions and analytical results are tabulated in Table 1 below with certain values indicated in weight percent. In each run recovery of the urethane was essentially 100 percent.

TABLE 1

| Run No. | 1 | 2 | 3 | 4 |
|---|---|---|---|---|
| Urethane Feed (g) | 15.4% EPC[(1)] in xylene (50 g.) | 8.3% EPC in xylene (50 g.) | 82% EPC in nitrobenzene (8 g.) | 84% EPC in nitrobenzene (8 g.) |
| Se Concentration in Total Feed (ppm) | 390 | 74 | 1800 | 690 |
| Concentration H$_2$O$_2$ Wt. % - (g) | 10.1 (1.0 g.) | 2.1 (2.0 g.) | 4.3 (1.0 g.) | 31 (1.0 g.) |
| Temperature (° C.) | 85 | 85 | 85 | 90 |
| Reaction Time (min.) | 30 | 60 | 60 | 30 |
| Ratio-H$_2$O$_2$/Se mol/mol | 12 | 26 | 7 | 130 |
| Se Removed from Urethane (%) | 99.1 | 84.7 | 97 | 93.2 |
| Run No. | 5 | 6 | 7 | 8 |
| Urethane Feed (g) | as in run #4 | 80% EPC in nitrobenzene (8 g.) | 87% EPC in nitrobenzene (8.1 g.) | 42% EPC in nitrobenzene (16%)/o-terphenyl (40%) (55.8 g.) |
| Se Concentration in Total Feed (ppm) | 690 | 1790 | 1800 | 1270 |
| Concentration H$_2$O$_2$ Wt. % - (g) | 49 (1.0 g.) | 31 (.90 g.) | 4.3 (1.75 g.) | 11 (8.0 g.) |

TABLE 1-continued

| | | | | |
|---|---|---|---|---|
| Temperature (° C.) | 90 | 90 | 85 | 80 |
| Reaction Time (min.) | 60 | 30 | 60 | 30 |
| Ratio-H$_2$O$_2$/Se mol/mol | 207 | 45 | 12 | 29 |
| Se Removed from Urethane (%) | 98 | 93.5 | 98 | 92.3 |
| Run No. | 9[2] | 10[2] | 11[2] | 12[2] |
| Urethane Feed (g) | 92% EPC-<7% nitrobenzene (30 g.) | as in run #9 (450 g.) | 99% EPC-<1% nitrobenzene (30 g.) | as in run #11 |
| Se Concentration in Total Feed (ppm) | 195 | 195 | 124 | 124 |
| Concentration H$_2$O$_2$ Wt. % - (g) | 3.7 (2.2g) | 11 (39 g.) | 10.5 (.40 g.) | 10.5 (1.0 g.) |
| Temperature (° C.) | 90 | 80 | 80 | 80 |
| Reaction Time (min.) | 30 | 30 | 30 | 30 |
| Ratio-H$_2$O$_2$/Se mol/mol | 32 | 110 | 26 | 66 |
| Se Removed from Urethane (%) | 81.9 | 84 | 53.8 | 59.4 |
| Run No. | 13 | 14 | 15 | 16 |
| Urethane Feed (g) | 8.7% TDU[3] in nitrobenzene (58.7 g.) | as in run #13 (58.9 g.) | 9%TDU in xylene (43.7 g.) | as in run #15 (45 g.) |
| Se Concentration in Total Feed (ppm) | 750 | 750 | 900 | 900 |
| Concentration H$_2$O$_2$ Wt. % - (g) | 1.4 (6.0 g.) | 4.7 (6.06 g.) | 1.1 (6.0 g.) | 28.5 (.70 g.) |
| Temperature (° C.) | 50 | 50 | 90 | 50 |
| Reaction Time (min.) | 30 | 120 | 30 | 75 |
| Ratio-H$_2$O$_2$/Se mol/mol | 4.4 | 15 | 3.9 | 4 |
| Se Removed from Urethane (%) | 88.6 | 93 | 83.8 | 93.2 |
| Run No. | 17 | 18 | | |
| Urethane Feed (g) | 17.7% TDU in xylene (44 g.) | 14% TDU in xylene (44 g.) | | |
| Se Concentration in Total Feed (ppm) | 1560 | 2400 | | |
| Concentration H$_2$O$_2$ Wt. % - (g) | 11 (0.7 g.) | 11 (2.0 g.) | | |
| Temperature (° C.) | 80 | 80 | | |
| Reaction Time (min.) | 1[4] | 1[4] | | |
| Ratio-H$_2$O$_2$/Se mol/mol | 2.7 | 5.0 | | |
| Se Removed from Urethane (%) | 94.5 | 93.7 | | |

[1]EPC -ethylphenylcarbamate (selenium-containing)
[2]EPC treated in molten state - no added solvent
[3]TDU - diethyltoluene-2,4-dicarbamate
[4]TDU and hydrogen peroxide heated and mixed hot as in Example 1 with water quench cooling.

We claim:

1. A process for the recovery of selenium from selenium-containing urethane solutions derived from the selenium catalyzed reaction of an organic compound containing at least one hydroxyl group with carbon monoxide and a nitrogenous organic compound at elevated temperatures and pressures in the presence of a base and/or water, which comprises the steps of:
   distilling the reaction product seleniumcontaining urethane solution at a temperature of from about ambient to about 200° C. to remove unreacted hydroxyl compounds and any contained amine base compunds and/or water;
   adding an essentially water insoluble aromatic hydrocarbon or nitro, phenyl, alkyl or halogen substituted aromatic hydrocarbon to said distilled urethane solution forming a hydrocarbon-urethane-selenium containing solution;
   contacting the hydrocarbon-urethane-selenium solution at a temperature of between about 25° C. and 120° C. with an aqueous hydrogen peroxide solution having a hydrogen peroxide concentration of between about 0.5 and 50 weight percent to react with and extract selenium compounds from said solution and form a selenium-containing aqueous hydrogen peroxide phase and a urethane-containing hydrocarbon phase;
   separating the selenium-containing aqueous hydrogen peroxide phase from the hydrocarbon phase;
   treating the aqueous hydrogen peroxide phase to separate selenium compounds therefrom; and recovering said selenium.

2. A process according to claim 1 wherein the hydrocarbon-urethane-selenium solution is contacted with aqueous hydrogen peroxide at a temperature between about 60° C. and 90° C.

3. A process according to claim 1 wherein the water insoluble aromatic hydrocarbon is selected from the group consisting of nitrobenzene, terphenyl and xylene.

4. A process according to claim 3 wherein the aromatic hydrocarbon is nitrobenzene.

5. A process according to claim 3 wherein the aromatic hydrocarbon is xylene.

6. A process according to claim 1 wherein from 30 to 90 weight percent water insoluble aromatic hydrocarbon based on the total hydrocarbon-urethane-selenium solution is added to the distilled urethane solution prior to contact with the aqueous hydrogen peroxide solution.

7. A process according to claim 1 wherein the volume ratio of aqueous hydrogen peroxide solution to hydrocarbon-urethane-selenium-containing solution is from 5:1 to 1:100.

8. A process according to claim 7 wherein the ratio is 1:1 to 1:50.

9. A process according to claim 1 wherein the concentration of hydrogen peroxide in aqueous solution is in the range of from about 3 weight percent to 30 weight percent.

10. A process according to claim 1 wherein the separated selenium-containing aqueous phase is subjected to distillation or evaporation to remove the water leaving a selenium compound concentrate.

11. A process according to claim 10 wherein the selenium compound concentrate is treated with air or oxygen at a temperature of from about 300° C. to 800° C. to convert selenium compounds to selenium dioxide and recovering said selenium dioxide.

12. A process according to claim 10 wherein the selenium compound concentrate is heated to between about 250° C. to 750° C. in an inert gas stream to volatilize selenium and recovering said volatilized selenium.

13. A process according to claim 1 wherein the selenium-containing urethane solution is a selenium-containing diethyltoluene-2,4-dicarbamate solution, and the water insoluble aromatic hydrocarbon is xylene.

14. A process according to claim 13 wherein the aromatic hydrocarbon is nitrobenzene.

15. A process according to claim 1 wherein the selenium-containing urethane solution is a selenium-containing ethylphenylcarbamate solution and the water insoluble aromatic hydrocarbon is nitrobenzene.

16. A process according to claim 15 wherein the solvent is xylene.

17. A process for the recovery of selenium from selenium-containing urethane solutions derived from the selenium catalyzed reaction of an organic compound containing at least one hydroxyl group with carbon monoxide and a nitrogenous organic compound at elevated temperatures and pressures in the presence of a base and/or water, which comprises the steps of:

distilling the reaction product selenium-containing urethane solution at a temperature of from about ambient to about 200° C. to remove unreacted hydroxyl compounds and any contained amine base compounds and/or water;

heating the distilled selenium-containing urethane to a temperature of up to about 120° C., essentially in the absence of solvent, to form a molten urethane-selenium containing solution;

contacting the molten urethane-selenium containing solution at a temperature between about the melt point of the selenium containing urethane and 120° C. with an aqueous hydrogen peroxide solution having a hydrogen peroxide concentration of between about 0.5 and 50 weight percent, to react with and extract selenium compounds from said molten urethane solution and form a selenium-containing aqueous hydrogen peroxide phase and an organic urethane phase;

separating the selenium-containing aqueous phase from the organic urethane phase;

treating the aqueous phase to separate selenium compounds therefrom; and recovering said selenium.

18. A process according to claim 17 wherein the selenium-containing urethane solution is a selenium-containing ethylphenylcarbamate solution.

19. A process according to claim 17 wherein the volume ratio of aqueous hydrogen peroxide solution to molten urethane-selenium containing solution is from about 5:1 to 1:100.

* * * * *